Figure 1:
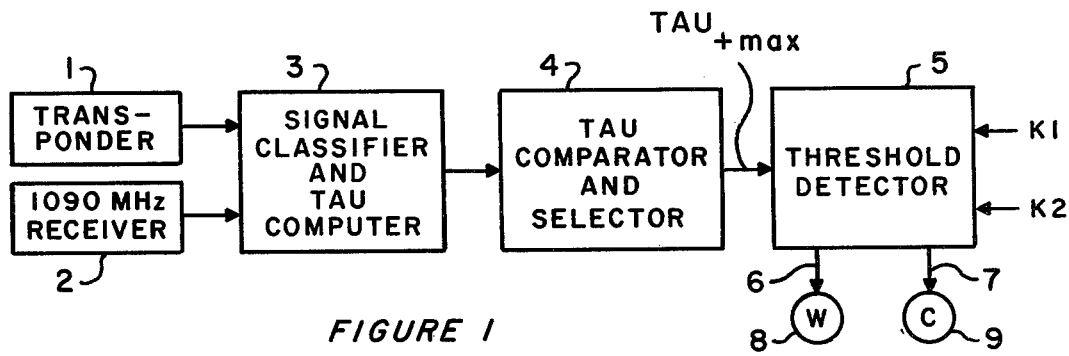

United States Patent [19]

Litchford

[11] 4,021,802
[45] May 3, 1977

[54] COLLISION AVOIDANCE SYSTEM

[75] Inventor: George B. Litchford, Northport, N.Y.

[73] Assignee: Litchstreet Co., Northport, N.Y.

[22] Filed: July 29, 1975

[21] Appl. No.: 599,961

[52] U.S. Cl. .................... 343/6.5 LC; 343/112 CA
[51] Int. Cl.² ........................................... G01S 9/56
[58] Field of Search ..... 343/6.5 R, 6.5 LC, 112 CA

[56] References Cited
UNITED STATES PATENTS

| | | | |
|---|---|---|---|
| 3,893,112 | 7/1975 | Miller | 343/6.5 LC |
| 3,895,382 | 7/1975 | Litchford | 343/6.5 LC |

Primary Examiner—T.H. Tubbesing
Attorney, Agent, or Firm—Brumbaugh, Graves, Donohue & Raymond

[57] ABSTRACT

A collision-predictive CAS at a protected station or vehicle that produces TAU data relating to differential azimuth and/or TOA from standard ATCRBS interrogations and replies, and selects the largest closing TAU signal of a threatening Other station to provide reliable warning while minimizing false alarms. Similarly processed differential altitude information provides a further criterion. Multiple radar environments enable production of additional sets of TAU values and increased discrimination against false alarms.

20 Claims, 3 Drawing Figures

COLLISION AVOIDANCE SYSTEM

BACKGROUND

1. Field

This invention pertains to collision threat assessment for vehicles, such as aircraft, to enable timely action, when necessary, for avoidance of other aircraft or suitably designated obstacles.

2. Prior Art

Many collision avoidance systems (CAS) have been devised or proposed for providing an estimate of the time to a collision, usually designated as TAU. Such systems generally are intended to operate by measuring the range between the Own aircraft and the Other aircraft, and measuring or computing the range-rate, or radial closing velocity. TAU is simply the range divided by the range-rate, and when it reaches some predetermined value, say 20 seconds, it may be assumed that some avoidance maneuver should be undertaken.

Airborne radio measurements of range and range-rate usually require two-way transmissions between the Own aircraft and each Other aircraft in the general area, resulting in the so-called $N^2$ problem, with excessive jamming or "fruit." Ground-based measurements require data uplink transmissions to at least any aircraft approaching a collision situation, and can be subject to intolerably large errors under certain conditions.

Proximity indicators or warning systems (PWI) that use the existing standard Air Traffic Control Radar Beacon System (ATCRBS) signals to minimize or avoid two-way air-to-air transmissions are described in the following U.S. Patents:

| | |
|---|---|
| 3,626,411 | 3,858,210 |
| 3,735,408 | 3,858,211 |
| 3,757,324 | 3,875,570 |

These systems take advantage of the ATCRBS signal format and the azimuthal scanning characteristics of the Secondary Surveillance Radar (SSR), which are standardized throughout the world, without interference with their present functions and without requiring additional frequency assignments.

A PWI by definition responds to an existing proximity situation rather than a potential one. Accordingly, the protected airspace, i.e., the volume surrounding the Own aircraft within which another aircraft is declared to be in proximity, must be large enough to allow time for appropriate action before an actually unsafe proximity can occur. PWIs do not provide a threat assessment, leaving the pilot to do so. The required volume must be large enough so that at least occasionally it encloses other aircraft on such courses and/or moving at such relative velocities that they offer no possible threat of collision with Own aircraft. Such aircraft will produce unneeded proximity warnings, frequently when they are most troublesome.

SUMMARY

According to this invention, techniques disclosed in the above-listed patents are used to provide differential azimuth and differential time of signal arrival (TOA) information, at an Own station, with regard to any transponder-equipped aircraft or other potential obstacle lying within a predetermined azimuthal sector extending from an SSR. If Own and Other are within the service areas of one or more additional SSRs, similar information may usefully be obtained also from any or most of them.

Since each SSR is assigned a different pulse repetition characteristic and a different beam rotation period, the data obtained from each particular radar can be tagged to distinguish it from similar type data obtained from any other radar. Aircraft replies convey similar PRP characteristics, associating each reply to the radar that elicits it. Similarly, all data obtained with regard to each particular transponder-equipped Other station can be tagged in accordance with its assigned identity reply code and/or any other suitable characteristic of Other's reply, such as its relative positional parameters.

The differential azimuth, hereinafter designated A, differential time of arrival, hereinafter designated T, and preferably also the differential altitude, hereinafter designated H, with regard to each Other transponder within the predetermined azimuth sector from each particular radar are updated while the main beam sweeps that sector, every P seconds, where P is the beam rotation period, usually 4 to 10 seconds.

Denoting the most recent differential azimuth with respect to a particular Other transponder station as $A_n$, and the immediately previous differential azimuth (obtained P seconds earlier) as $A_{n-1}$, $$TAU_A = \frac{PA_n}{A_n - A_{n-1}}.$$

If A is decreasing, $TAU_A$ is positive, and is a prediction of the time to go until A reaches zero. If A is increasing, $TAU_A$ is negative, indicating that A can never reach zero under the existing conditions.

In similar manner, $TAU_T$ and $TAU_H$ for each particular Other transponder station of interest can be obtained from any selected available SSRs. It might be expected that in an idealized geometrical collision situation, all TAU values for a particlar Other should be equal, indicating that A, T and H will become zero at the same instant, i.e., Own and Other will be at the same point in space after elapse of time TAU. Because the A and T coordinates are nonlinear, and because systemic errors are always possible, the TAU values are seldom exactly equal, even when collision is imminent. However, when the TAU values are determined with appropriate allowance for maximum expected system errors, it is found that the maximum, rather than the minimum TAU is the preferred prediction time. It can never be greater than the true time to collision, if any, and ordinarily will not be much less. By determining all suitable available TAU information and selecting the largest in accordance with this invention, false alarms are minimized without compromise of safety. The system may be entirely passive, requiring no radio transmissions other than those already in use for other purposes, or may be combined with other, active or semiactive, systems as a back-up or a false alarm filter.

DRAWING

Figure 2:
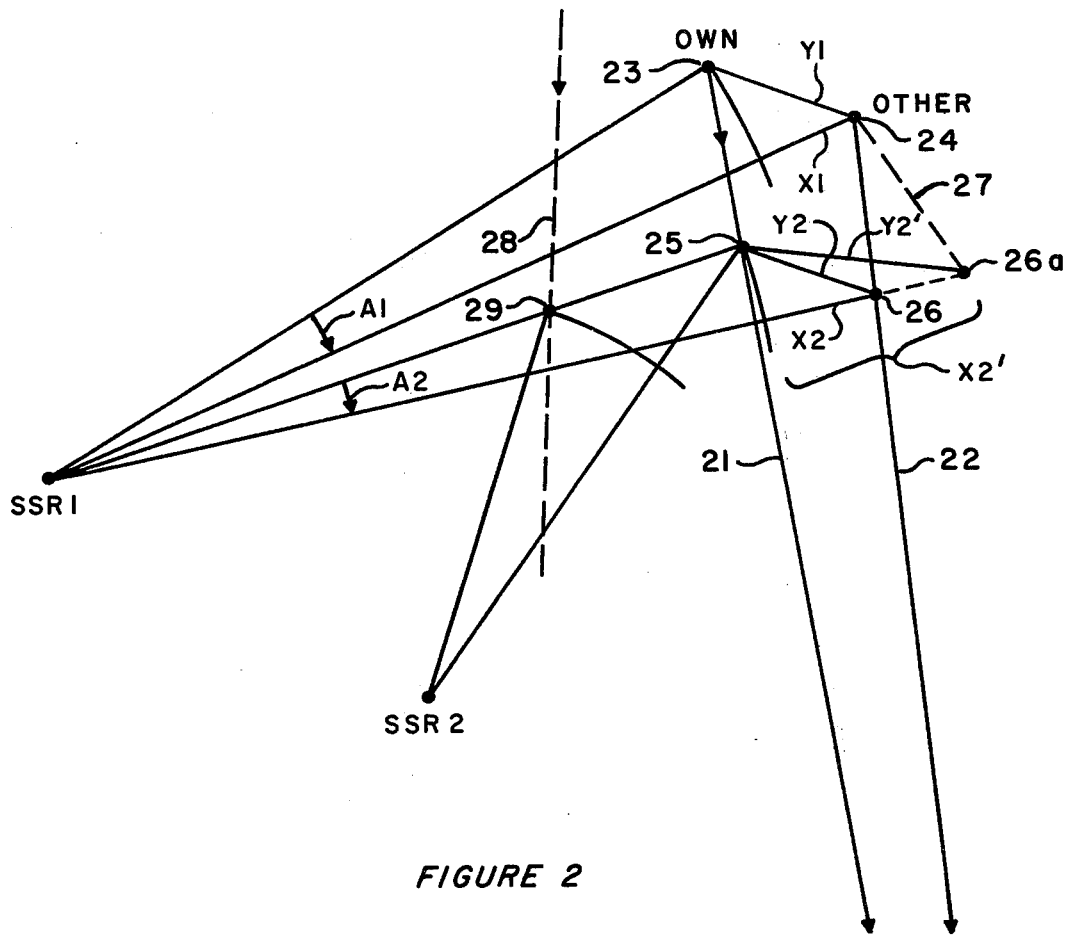
Figure 3:
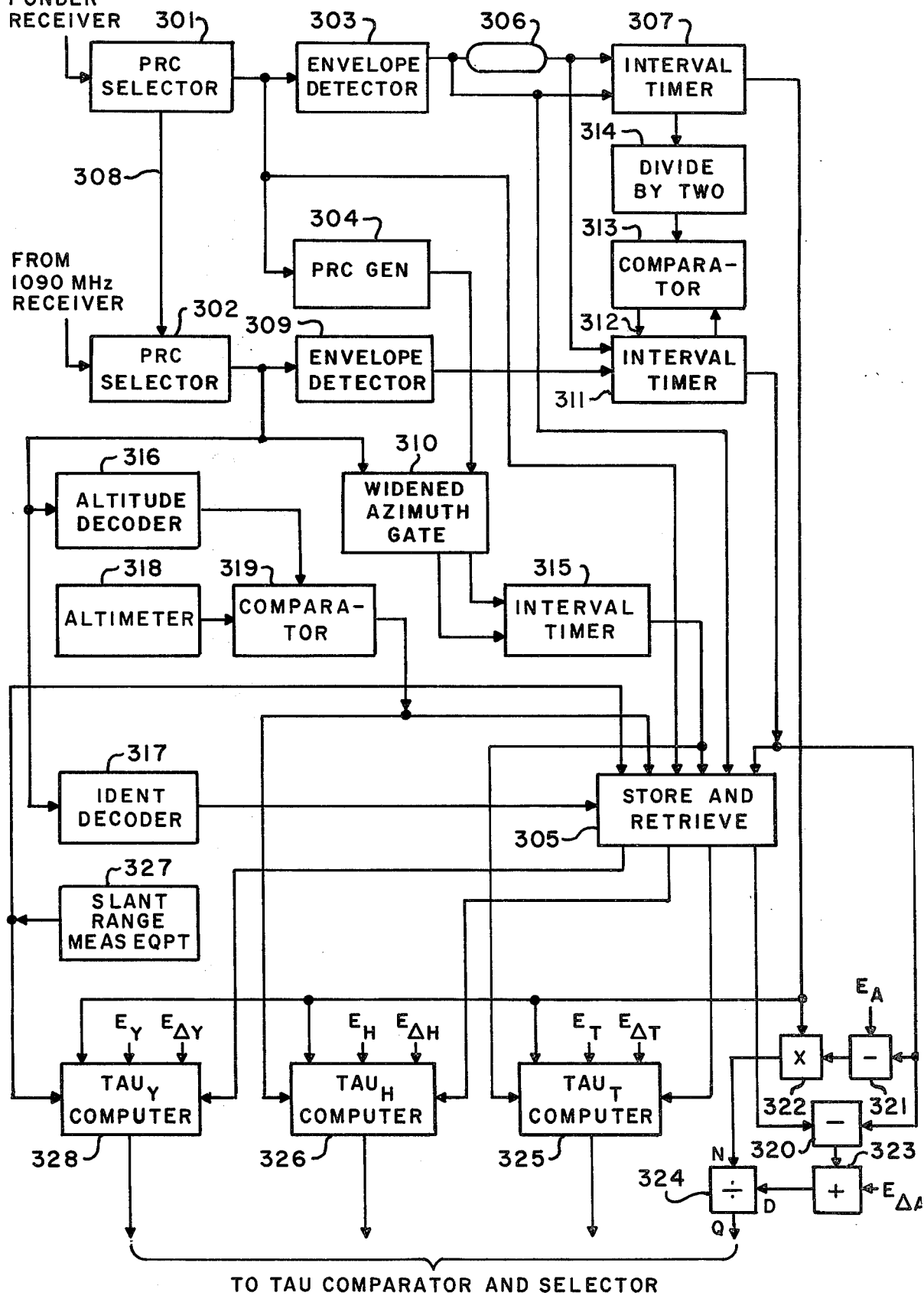

FIG. 1 is a block diagram illustrating generally a preferred embodiment of the invention. FIG. 2 is a geometrical diagram used in explaining the operation of the apparatus of FIG. 1. FIG. 3 is a more detailed block diagram showing a specific implementation of the signal classifier and TAU computer of FIG. 1.

DESCRIPTION

Referring to FIG. 1, the equipment at an Own station, typically aboard an aircraft or other mobile vehicle, includes a standard ATCRBS transponder 1 adapted to receive interrogations at 1030 MHz from conventional SSRs and reply thereto at 1090 MHz. It is arranged to provide an output pulse in response to each received interrogation, in a predetermined time relationship to the $P_3$ pulse of such interrogation. A 1090 MHz receiver 2 is adapted to receive the reply signals of any other transponders within its range that are emitted in response to SSR interrogations, providing pulse outputs corresponding to said replies.

The outputs of transponder 1 and receiver 2 are applied to a signal classifier and TAU computer means 3, described more fully below, which separates the received signals into groups on the bases of Other's transponder identity codes and the secondary radar or radars that are eliciting their responses. Means 3 also determines differential azimuth A, differential time of arrival T and SSR rotation period in each case, and computes the respective TAU values. In addition, when altitude and/or slant range information is available, the means 3 may provide corresponding TAU values in similar manner.

The TAU values are updated each time an SSR main beam sweeps a predetermined azimuth sector containing the Own and Other station. The following TAU sign convention is adopted in this case. If a parameter is decreasing, the corresponding TAU is positive, indicating a closing condition between Own and Other stations, with respect to that parameter. A negative TAU implies a separating condition, i.e., that the Own and Other station are becoming farther apart in a corresponding spatial coordinate.

The computed TAU values, each tagged according to the respective identity signals emitted by Other's transponder from which it was derived, are transferred as updated to a comparator and selector device 4. The device 4 includes storage means such as digital registers and identity-controlled gates for grouping all TAUs relating to each identified transponder, and means for comparing the TAU values of each group. If any TAU value of a group is negative, the entire group is rejected. If all TAU values of a group are positive, the comparator selects the largest and provides an output representing its value. This output, designated $TAU_{+max}$ is applied to a threshold detector 5.

The threshold detector is a two-level comparator arranged to produce an output on line 6 if $TAU_{+max}$ falls below a first predetermined value K1, and an output on line 7 if $TAU_{+max}$ falls below a second, lower value K2. Output on line 6 energizes an initial warning indicator 8. Output on line 7 energizes a final warning or command-to-maneuver indicator 9.

FIG. 2 depicts in plan view the flight paths and partial flight path histories of an Own craft and several Other craft in an exemplary situation. Own's flight path is indicated by line 21, and an Other's flight path by line 22. Both craft are moving as indicated by the arrowheads. At some initial reference time $t_1$, Own is at point 23 and Other is at point 24. Time $t_1$ may be considered as the central instant of an interval of about 50 milliseconds while point 24 (Other) is swept by the main beam of an SSR designated SSR-1.

All SSRs rotate clockwise at characteristic assigned rotation periods, P, of about 4 to 10 seconds. That of SSR-1 has been determined at Own's station by measurement of the interval between two or more main beam passages prior to time $t_1$. In the illustrated situation, the beam first illuminates Own's position 23, interrogating its transponder 1 (FIG. 1), then illuminates Other's position 24, interrogating its transponder. The replies from Other's transponder are received at Own's 1090 MHz receiver 2.

The interrogations received by the 1030 MHz receiver in Own's transponder 1 are decoded in the transponder to produce a burst of 20 to 30 output pulses corresponding to each interrogation message during the radar beam passage. These reply pulses are used to trigger a 15 bit SSR reply message, and will have the same pulse repetition characteristic (PRC) as that assigned to the SSR 1. The word "characteristic" is used here to account for the fact that some radars are assigned so-called "staggered" pulse repetition periods, that is, the time between successive interrogations varies in a predetermined sequence or pattern. Typcially, an eight-step staggered PRP is repeated continuously, allowing two or more measurements of the stagger pattern during a beam dwell.

Similarly, the replies from Other's transponder received at Own's receiver will have the same PRC. The received reply messages are decoded by equipment in means 3, which may be similar to that in the SSR, to provide a burst of 20 to 30 pulse replies while the SSR beam interrogates the Other station. Said equipment also decodes the identity message in Other's replies, and the altitude message where available.

The interval between the burst of reply pulses from transponder 1 (its 1030 MHz receiver) and the related burst from receiver 2 is measured in means 3. This interval, divided by the previously measured beam rotation period P, is a measure of the differential azimuth A between own craft and the other craft under consideration. Referring to FIG. 2, the value os A at time $t_1$ is designated A1.

During the next rotation of the radar beam, the Other craft moves from point 24 to point 26. The instant when the beam center strikes point 24 is designated $t_2$, and is about P seconds later than $t_1$. At this time, Own craft has moved from point 23 to point 25, and the differential azimuth is A2. It is seen that A has decreased by the amount A1 − A2 in approximately P seconds. The $TAU_A$ computer device in means 3 produces a representation of the current value of $TAU_A$ for application to the TAU comparator and selector 4. This also applies if one station is stationary.

The output pulse messages from transponder 1 that appear while the radar beam sweeps Own's position are used to synchronize a reference pulse generator in means 3, which continues to run throughout the beam rotation period, producing refernce pulses in the same PRC pattern. Each identified F2 pulse hereinafter referred to as a reply mark pulse, in the Other's reply received by receiver 2 is delayed with respect to a corresponding reference pulse by an amount which is a measure of the differential time of arrival T.

Referring again to FIG. 2, at the instant $t_1$ Other is X1 farther from the SSR than Own, and receives each interrogation later than Own by an interval X1/c, where c is the radio propagation velocity. The slant range R between Own and Other at $t_1$ is Y1. Other's reply requires an additional time interval Y1/c to reach Own.

The algebraic sum of these intervals is T. X may be considered negative when Other is closer to the radar than Own.

In this example T1 is the value of T at $t_1$. X2 and Y2 are the respective values of differential distance from the radar and slant range R at the instant $t_2$. It is seen that both decreased during the interval between $t_1$ and $t_2$, and therefore T2 is less than T1. The $TAU_T$ computer in means 3 of FIG. 1 produces a representation of the current value of $TAU_T$ which is applied to the TAU comparator 4. Considering for the present only the parameters A and T, and assuming the flight paths 21 and 22 of Own and Other in FIG. 2 are at the same altitude, it is seen that said paths are covering toward an intersection at a potential collision point beyond the area shown in FIG. 2. $TAU_A$ is a quantitative prediction of the time to go until A will become zero, i.e., Own and Other will then be on the same radial line from SSR. Thus, $TAU_A$ is an assessment of the threat of a collision.

Now assume that Other, instead of following line 22, is on a course represented by the dash line 27. Then at the instant $t_2$, Other will be at point 26a instead of point 26. It is seen that A2 is the same as it was in the previous example, and therefore $TAU_A$ will be the same, indicating a possible threat of collision in, say, 30 seconds.

However, the difference in distance from the radar X2' and the slant range Y2' are both larger than X1 and Y1, and $TAU_T$ at the time $t_2$ is negative, indicating that there is no possible threat of a collision, as can be verified by noting that Other's course, on line 27, is diverging from Own's course on line 21.

The negative sign of $TAU_T$ causes all TAUs of the associated group to be rejected, as mentioned above. This may be effected simply by designing the comparator and selector 4 of FIG. 1 to produce a $TAU_{+max}$ output well in excess of the upper threshold K1 in response to occurrence of a negative TAU.

It can be seen without further illustration that if the course lines 21 and 22 of FIG. 2 were more nearly parallel but still convergent, A could reach zero long before T reaches zero, that is, $TAU_A$ could be much less than $TAU_T$. Since no collision could possibly occur before the larger $TAU_T$ approached zero, the logic of selecting the larger positive TAU value is apparent.

It is possible for both $TAU_A$ and $TAU_T$ to go to zero when there is absolutely no threat of collision if Other follows a course that crosses a line between Own and the SSR, such as that indicated by the dash line 28 in FIG. 2. Suppose Other reaches point 29 as Own reaches point 25. At this time, both A and T will be zero. Some time earlier, both $TAU_A$ and $TAU_T$ will decrease below threshholds K1 and K2. Such an event would result in a false alarm in the absence of additional threat criteria. In such a case with only one radar active range could apply to resolve it.

Additional $TAU_A$ and $TAU_T$ criteria are almost always available in plural radar environments. For example, a second radar SSR2 will provide A and T data with regard to the Other craft on course line 28 substantially different from that provided by SSR1, because the radars are at different locations and view the situation from different aspects. Ordinarily, the TAU values derived from one radar will remain above the alarm thresholds while those derived from the other radar may be below.

Many aircraft presently carry apparatus for reporting barometric altitude in their replies to Mode C interrogations, and it is expected that eventually all aircraft permitted to fly in designated airspace regions, where collisions are more likely due to congestion, will be required to do so. It is within the contemplation of this invention that Other's decoded altitude information obtained by way of Own's 1090 MHz receiver shall be compared to Own's altitude to determine differential altitude and direction and be processed in the same manner as described above to provide $TAU_H$ as a threat criterion and compare it with $TAU_A$ and/or $TAU_T$ to select the largest. In addition, direct slant range (R or Y) data may be produced in some cases, by Own interrogating Other's transponder as in the manner described in U.S. Pats. Nos. 3,757,324, 3,858,210, and 3,875,570, and processed similarly to produce $TAU_R$ as a further threat criterion. In any event, all available TAUs concerning a particular Other craft are examined; if all are positive, the largest is tested against the thresholds. Each of the TAU criteria acts as a filter to discriminate against false alarms that might otherwise be caused by one of the other TAUs.

The signal classifier and TAU computer 3 of FIG. 1 is shown in more detail in FIG. 3. The outputs of Own's transponder 1030 MHz receiver and the 1090 MHz receiver are applied to respective PRC selectors 301 and 302. The PRC selectors may be like the corresponding devices provided at ground-based SSRs to select the responses to their own interrogations, made adjustable to enable selection of any desired SSR repetition characteristic.

the output of PRC selector 301 goes to an envelope detector 303, a PRC generator 304 and to data storage and retrieval means 305. The PRC generator produces pulses in synchronism with those in the output of PRC selector 301 when they are present, i.e., when the selected SSR's beam is directed toward Own and is thus interrogating Own's transponder, and continues to produce such pulses while the main beam interrogations are absent. The generator 304 is resynchronized with the SSR each time the rotating radar beam scans by Own's azimuthal location, maintaining a close approximation to a simulation of the reference pulses that would occur in the output of the PRC selector 301 if Own's transponder were interrogated continuously by the selected SSR throughout its beam rotation period. U.S. Pat. No. 3,858,210 describes a PRC lock to the omnidirectional SLS signals as another synchronizing method.

The envelope detector 303 produces a single, preferably longer, pulse in response to each burst of pulses supplied from the PRC selector while Own's transponder is interrogated. This pulse goes to the storage and retrieval means 305, and also is applied directly to the stop input terminal, and through a delay 306 to the start input terminal of an interval timer 307. Timer 307 may be of the type described in U.S. Pat. No. 3,757,324 with reference to FIG. 6 thereof. Each pulse stops the timer and causes it to deliver an output representing the time elapsed since the previous input pulse, then restarts it to measure the next interval. The output of timer 307 represents, preferably in digital form, the 360° rotation period P of the selected SSR.

The PRC selector 302 is adjusted in conformity with selector 301, as indicated by line 308. Its output is applied to an envelope detector 309, a widened azimuth gate device 310, and through identity decoder 317 to the storage and retrieval means 305. The envelope detector 309 is like the detector 303, and its output goes to the stop input terminal of an interval timer 311. The start input terminal of timer 311 receives the same input as that of timer 307.

Timer 311 is generally similar to timer 307, with means for counting clock pulses while it is running. In this case the counter is reversible, and is arranged in known manner to count down instead of up when a signal is applied to a control input terminal 312. A count comparator 313 is connected to receive the count currently standing in timer 311. It also receives from timer 307 by way of a divide-by-two device 314, a count corresponding to one half the SSR rotation interval P.

When the two counts become equal and the comparator produces a signal, the counter in timer 311 is reversed, remaining in that mode until stopped by the next subsequent pulse from envelope detector 309. The output of timer 311 represents, preferably in digital form, the differential azimuth A between Own and Other. This data, including the direction of the count, goes to the storage and retrieval means 305.

The outputs of PRC selector 302 and PRC generator 304 go respectively to the start and stop terminals of an interval timer 315 by way of the widened azimuth gate 310, which may be of the type described in U.S. Pat. No. 3,735,408. The timer 315 is similar to timers 307 and 311, but designed to measure shorter intervals of up to 100 microseconds, for example. Its output represents the differential time of arrival, T, between a pulse from PRC generator 304, representing or simulating a received interrogation, and a corresponding reply from the Other. This data is also conveyed to the storage and retrieval means 305.

The output of PRC selector 302 is also supplied to an altitude decoder 316 and an identity decoder 317, which may be similar to the respective reply decoders provided at the SSR. Own's altitude is supplied by an altimeter 318, and compared in known manner with Other's altitude data from decoder 316 in a comparator 319 to provide an output representing differential altitude H and direction (above-below) between Own and Other. This too is sent to the storage and retrieval means 305. Other's identity, provided by decoder 317, is also entered in the means 305.

The storage and retrieval means 305 comprises a plurality of storage devices, preferably digital registers, and input gate means arranged in known manner to direct the input data to groups of storage locations or addresses that are assigned according to the respective Other's identity as determined by the decoder 317. To accommodate the usual multiple radar environment, provision is made to separate said address groups into subgroups, assigned according to respective SSRs as identified by their pulse repetition characteristics determined by PRC selector 301.

The data regarding each identified Other is updated in the storage means as it appears, with each beam rotation of the radar with which it is associated. The corresponding previously stored data is transferred out to a respective TAU computer, such as the $TAU_A$ computer shown in detail in the lower right portion of FIG. 3.

The $TAU_A$ computer comprises subtracting devices 320 and 321, multiplying device 322, adding device 323 and dividing device 324, connected as shown. The subtractor 320 receives the current A data, designated $A_n$ as it is stored in means 305, and the corresponding previously stored A data, designated $A_{n-1}$. $A_n$ data is also applied to subtractor 321, where a predetermined quantity $E_A$, representing the maximum probable error in the determination of A, is subtracted from it. Considering the present state of the art, $E_A$ may be said to represent 0.25°.

The output $A_n - E_A$ of subtractor 321 is applied to multiplier 322, which also receives a representation of the rotation period P of the corresponding SSR from interval timer 307. The output of multiplier 322, representing $P(A_n - E_A)$, is applied also as a numerator input to the divider 324.

The output of subtractor 320, representing $A_{n-1} - A_n$, goes to the adding device 323, where it is augmented by a quantity $E_{\Delta A}$ that represents the maximum probable error in the determination of the change of differential azimuth during the period P. This quantity may be taken to be 0.5°. The output of device 323, representing $A_{n-1} - A_n + E_{\Delta A}$, is applied as the denominator input to the divider 324.

The quotient output of divider 324 is a representation of $$\frac{P(A_n - E_a)}{A_{n-1} - A_n + E_{\Delta A}},$$

which is an estimate of $TAU_A$, the time to go for A to reach zero, including allowances for the possible errors in Own's and Other's relative azimuths. It is seen that $TAU_A$ is of positive sign if A is decreasing, i.e., Own and Other are closing in azimuth, and that the possible errors are accounted for so that the estimate, if in error, will be on the low side. The computed $TAU_A$ is updated each time respective new A data becomes available, and goes to the TAU comparator and selector 4 of FIG. 1, as previously described. Several, say five or more, successive values can be stored for data smoothing in known manner, if desired.

A $TAU_T$ computer 325, which may be of the same design as the $TAU_A$ computer, receives inputs representing $T_n$, $T_{n-1}$, T and error allowances $E_T$ and $E_{\Delta T}$, and operates in the same manner as the $TAU_A$ computer to provide periodically updated $TAU_T$ input to the comparator and selector 4. Typical values of $E_T$ and $E_{\Delta T}$ are 2 microseconds and 0.2 microsecond, respectively. Similarly, a $TAU_H$ computer 326 receives corresponding H related inputs and provides $TAU_H$ input to the comparator and selector 4. Suitable values for $E_H$ and $E_{\Delta H}$ are 500 feet and 100 feet, respectively.

In some situations, data as to direct slant range Y between Own and an identified Other may be available, for example, as described in U.S. Pat. No. 3,858,210. Apparatus for providing such data is denoted generally in FIG. 3 by the block 327. The range data goes to means 305 and to a $TAU_Y$ computer 328, where it is processed in the same way as the A, T and H data to provide a further threat discriminant.

I claim:

1. A collision avoidance system including, at an Own station
   a. means for receiving the interrogation messages transmitted by a selected SSR,
   b. means for receiving reply messages transmitted by a transponder-equipped Other station in response to such interrogation messages, c. means for identifying said Other station according to its reply messages, d. means for identifying the SSR eliciting said reply messages according to the pulse repetition characteristics thereof, e. means for determining from the time relationships between said received interrogation messages and said received reply messages, data as to the differential position of said identified Other station with respect to the Own station in at least the azimuth coordinates from said identified SSR, f. means for determining respective TAU values from said differential position data, g. means for selecting the largest TAU value related to said identified Other station, h. means for producing a threat warning signal in response to decrease of any such selected TAU value below a predetermined value.

2. The apparatus set forth in claim 1, wherein said means (e) further includes means for determining said differential positions in differential time of arrival coordinates.

3. The apparatus set forth in claim 1, wherein said means (e) further includes means for determining said differential positions in differential altitude coordinates.

4. The apparatus set forth in claim 1, further including:

i. means for measuring the slant range between Own station and said identified Other station, j. means for determining range TAU values corresponding thereto, and k. means for applying said range TAU values to said selecting means (g).

5. A collision avoidance system including, at an Own station a. means for receiving the interrogation messages transmitted by a selected SSR, b. means for receiving reply messages transmitted by a transponder-equipped Other station in response to such interrogation messages, c. means for identifying said Other station according to its reply messages, d. means for identifying the SSR eliciting said reply messages according to the pulse repetition characteristics thereof, e. means for determining, from the time relationships between said received interrogation messages and said received reply messages, data as to the differential position of said identified Other station with respect to the Own station in at least the differential time of arrival coordinates from said identified SSR, f. means for determining respective TAU values from said differential position data, g. means for selecting the largest TAU value related to said identified Other station, h. means for producing a threat warning signal in response to decrease of any such selected TAU value below a predetermined value.

6. The apparatus set forth in claim 5, wherein said means (e) further includes means for determining said differential positions in azimuth coordinates.

7. The apparatus set forth in claim 5, wherein said means (e) further includes means for determining said differential positions in differential altitude coordinates.

8. The apparatus set forth in claim 5, further including i. means for measuring the slant range between Own station and said identified Other station, j. means for determining range TAU values corresponding thereto, and k. means for applying said range TAU values to said selecting means (g).

9. A collision avoidance system including at an Own station, a. a receiver adapted to receive interrogations from a selected secondary surveillance radar (SSR) as the radar's main beam sweeps Own's location, b. a receiver adapted to receive replies from an identified transponder-equipped Other station as said radar beam sweeps said Other's location, c. interval timer means responsive to the outputs of said receivers to measure the SSR rotation period P and the interval between sweeps of Own's and said Other's locations by said SSR beam, d. means including said interval timer means to determine and produce a quantitative representation of the differential azimuth A and its sense between Own's and Other's locations with reference to the SSR, e. means responsive to said representation of A and to the passage of time to produce a representation $TAU_A$ of an estimate of the time to go for A to reach zero, and f. means including a threshold comparator and indicator for utilizing said $TAU_A$ representation as a collision threat evaluation criterion.

10. The invention set forth in claim 9, wherein said means (e) comprises g. means for subtracting each current representation ($A_n$) of the differential azimuth from a previous representation of ($A_{n-1}$) thereof measured during a previous rotation of the SSR beam and producing a representation of the difference ($A_n - A_{n-1}$), h. means for multiplying said current representation by said rotation period P and producing a representation of the product, and i. means for dividing said product representation $A_n$ by said current differential azimuth.

11. The invention set forth in claim 9, further including g. means responsive to the output of said interrogation receiver to produce reference pulses each marking the occurrence of a specified instant in the interrogation message of an SSR interrogation as it is received, and continuing to mark such instants in accordance with the pulse repetition characteristic of the SSR while interrogations are not received, h. means responsive to the output of said reply receiver to produce reply mark pulses, each marking the occurrence of a specified instant related to an element of a reply message as it is received at Own's station, i. further interval timer means responsive to said reference pulses and to said reply mark pulses to produce a representation of the differential time of arrival T of an interrogation and an Other's reply to that interrogation, j. means responsive to said representation of T and to the passage of time to produce a representation $TAU_T$ of an estimate of the time to go for T to reach zero, k. means responsive to said representations of $TAU_A$ and $TAU_T$ to select the larger, and l. means for applying said selected larger TAU representation to said threshold comparator and indicator means (f).

12. The invention set forth in claim 11, wherein said means (j) comprises m. means for subtracting each current representation ($T_n$) of the differential time of arrival from a previous representation ($T_{n-1}$) thereof measured during a previous rotation of the SSR beam and producing a representation of the difference, n. means for multiplying said difference representation by said rotation period P and producing a representation of the product, and o. means for dividing said current differential time of arrival representation $T_n$ by said product representation.

13. The method of assessing the threat of collision between an Own transponder-equipped station and an Other transponder-equipped station, comprising the steps of:

a. receiving at the Own station the interrogation messages transmitted by a selected SSR, b. receiving at the Own station reply messages transmitted by said transponder-equipped Other station in response to such interrogation messages, c. identifying said Other station according to its reply messages, d. identifying the SSR eliciting said reply messages according to the pulse repetition characteristics thereof, e. determining, from the time relationships between said received interrogation messages and said received reply messages, data as to the differential position of said identified Other station with respect to the Own station in at least the azimuth coordinates from said identified SSR, f. determining respective TAU values from said differential position data, g. selecting the largest TAU value related to said identified Other station, and h. producing a threat warning signal in response to decrease of any such selecting TAU value below a predetermined value.

14. The method set forth in claim 13, wherein said step (e) further includes the step of determining said differential positions in differential time of arrival coordinates.

15. The method set forth in claim 13, wherein said step (e) further includes the step of determining said differential positions in differential altitude coordinates.

16. The method set forth in claim 13, further including the steps of:

i. measuring the slant range between Own station and said identified Other station, j. determining range TAU values corresponding thereto, and k. applying said range TAU values to said selecting step (g).

17. The method of assessing the threat of collision between an Own transponder-equipped station and an Other transponder-equipped station, including the steps of:

a. receiving at an Own station the interrogation messages transmitted by an SSR, b. receiving at the Own station reply messages transmitted by a transponder-equipped Other station in response to such interrogation messages, c. identifying said Other station according to its reply messages, d. identifyiing the SSR eliciting said reply messages according to the pulse repetition characteristics thereof, e. determinging from the time relationships between said received interrogation messages and said received reply messages, data as to the differential position of said identified Other station with respect to the Own station in at least the differential time of arrival coordinates from said identified SSR, f. determining respective TAU values from said differential position data, g. selecting the largest TAU value related to said identified Other station, and h. producing a threat warning signal in response to decrease of any such selected TAU value below a predetermined value.

18. The method set forth in claim 17, wherein said step (e) further includes the step of determining said differential positions in azimuth coordinates.

19. The method set forth in claim 17, wherein said step (e) further includes the step of determining said differential positions in differential altitude coordinates.

20. The method set forth in claim 17, further including the steps of:

i. measuring the slant between Own station and said identified Other station, j. determining range TAU value corresponding thereto, and k. applying said range TAU values to said selecting step (g).

* * * * *